United States Patent
Tsutsui

(10) Patent No.: US 7,195,002 B2
(45) Date of Patent: Mar. 27, 2007

(54) FUEL INJECTION SYSTEM OF INTERNAL COMBUSTION ENGINE

(75) Inventor: Tsuneo Tsutsui, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 55 days.

(21) Appl. No.: 10/544,369

(22) PCT Filed: Aug. 30, 2004

(86) PCT No.: PCT/JP2004/012868

§ 371 (c)(1),
(2), (4) Date: Aug. 3, 2005

(87) PCT Pub. No.: WO2005/021952

PCT Pub. Date: Mar. 10, 2005

(65) Prior Publication Data

US 2006/0130812 A1    Jun. 22, 2006

(30) Foreign Application Priority Data

Sep. 1, 2003    (JP)    ............................. 2003-309335

(51) Int. Cl.
 F02M 59/46    (2006.01)
 F02B 3/00    (2006.01)
(52) U.S. Cl. ..................................... 123/467; 123/299
(58) Field of Classification Search ........ 123/446–447, 123/467, 299, 300
See application file for complete search history.

(56) References Cited

U.S. PATENT DOCUMENTS 6,718,946 B2    4/2004    Hokazono et al.

6,962,141 B2 *   11/2005   Kern ........................... 123/446

FOREIGN PATENT DOCUMENTS

| EP | 0 651 150 A2 | 5/1995 |
|---|---|---|
| EP | 0 878 617 A2 | 11/1998 |
| EP | 1 338 781 A2 | 8/2003 |
| JP | A 3-105042 | 5/1991 |
| JP | A 4-191433 | 7/1992 |
| JP | A 6-101552 | 4/1994 |
| JP | A 8-105350 | 4/1996 |
| JP | A 9-222045 | 8/1997 |
| JP | A 10-205383 | 8/1998 |
| JP | A 2000-018064 | 1/2000 |
| JP | A 2000-18074 | 1/2000 |
| JP | A 2001-164976 | 6/2001 |

\* cited by examiner

Primary Examiner—Thomas Moulis
(74) Attorney, Agent, or Firm—Oliff & Berridge, PLC

(57) ABSTRACT

An internal combustion engine provided with a common rail (13) and fuel injectors (3) connected to the common rail (13). When pilot injection is performed, the injection pressure pulsates. At this time, the injection amount of the main injection fluctuates by a certain fluctuation pattern. If indicating on an abscissa a time interval from when pilot injection is started to when main injection is started and indicating on the ordinate a fluctuation amount of main injection, the fluctuation pattern of the injection amount of the main injection becomes a form contracted or expanded in the abscissa direction in accordance with the fuel properties. This characteristic is utilized to find the fluctuation amount of the injection amount of the main injection.

7 Claims, 12 Drawing Sheets

| TW | TW₁ | TW₂ | TW₃ | TW₄ | TW₅ |
|---|---|---|---|---|---|
| NS | NS₁ | NS₂ | NS₃ | NS₄ | NS₅ |
| QS | QS₁ | QS₂ | QS₃ | QS₄ | QS₅ |

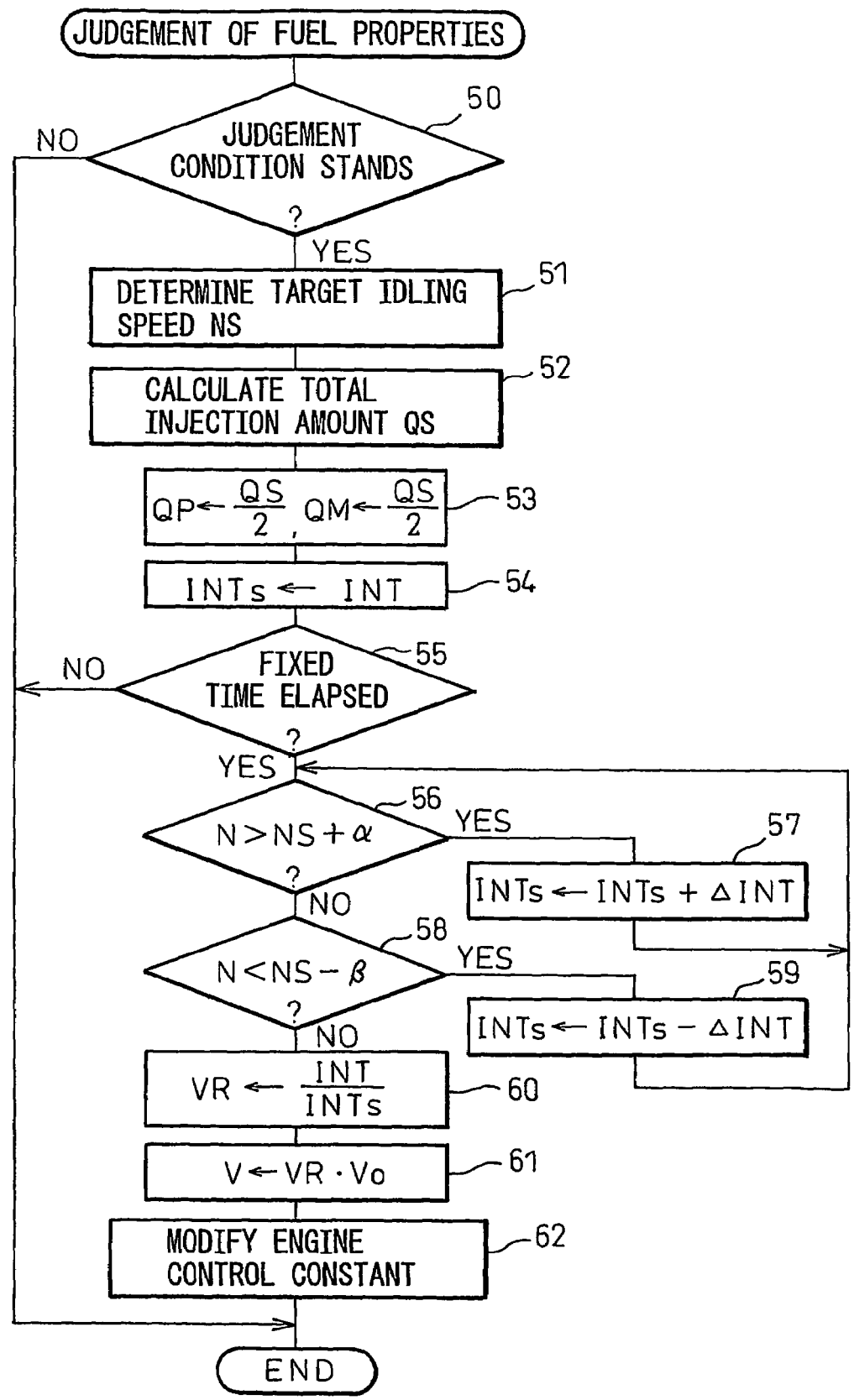

FUEL INJECTION SYSTEM OF INTERNAL COMBUSTION ENGINE

TECHNICAL FIELD

The present invention relates to a fuel injection system of an internal combustion engine.

BACKGROUND ART

An internal combustion engine designed so that the fuel injectors are connected to a common rail through high pressure lines and performing a plurality of fuel injections in a single cycle, for example two pilot injections and a succeeding main injection, is known (for example, see Japanese Unexamined Patent Publication (Kokai) No. 2000-18074). In this internal combustion engine, the main fuel injection is calculated from a map, and the injection amounts and injection timings of the first and second pilot injections are calculated from maps based on the main injection amount and the engine speed.

In such an internal combustion engine, however, if the fuel used changes, the fuel properties change. If the fuel properties change, the problems arise that deterioration of emission is invited or vehicle operability deteriorates.

DISCLOSURE OF INVENTION

An object of the present invention is to provide a fuel injection system of an internal combustion engine able to secure good emission and good engine operability.

According to the present invention, there is provided a fuel injection system of an internal combustion engine provided with a common rail and fuel injectors connected to the common rail, performing fuel injection from each fuel injector at least the two times of prior injection and later injection during one cycle of the engine, and changing in fluctuation amount of the later injection with respect to a target value depending on a time interval from when the prior injection is performed to when the later injection is performed, the fuel injection system of an internal combustion engine provided with a calculation device for calculating a propagation speed of pressure pulsation generated in a fuel injector at the time of prior injection, estimate fuel properties from the calculated propagation speed, and modifying a control constant of the engine based on the estimated fuel properties.

BRIEF DESCRIPTION OF DRAWINGS

FIG. 9 is a flow chart for judgment of fuel properties.

BEST MODE FOR CARRYING OUT THE INVENTION

Figure 1:
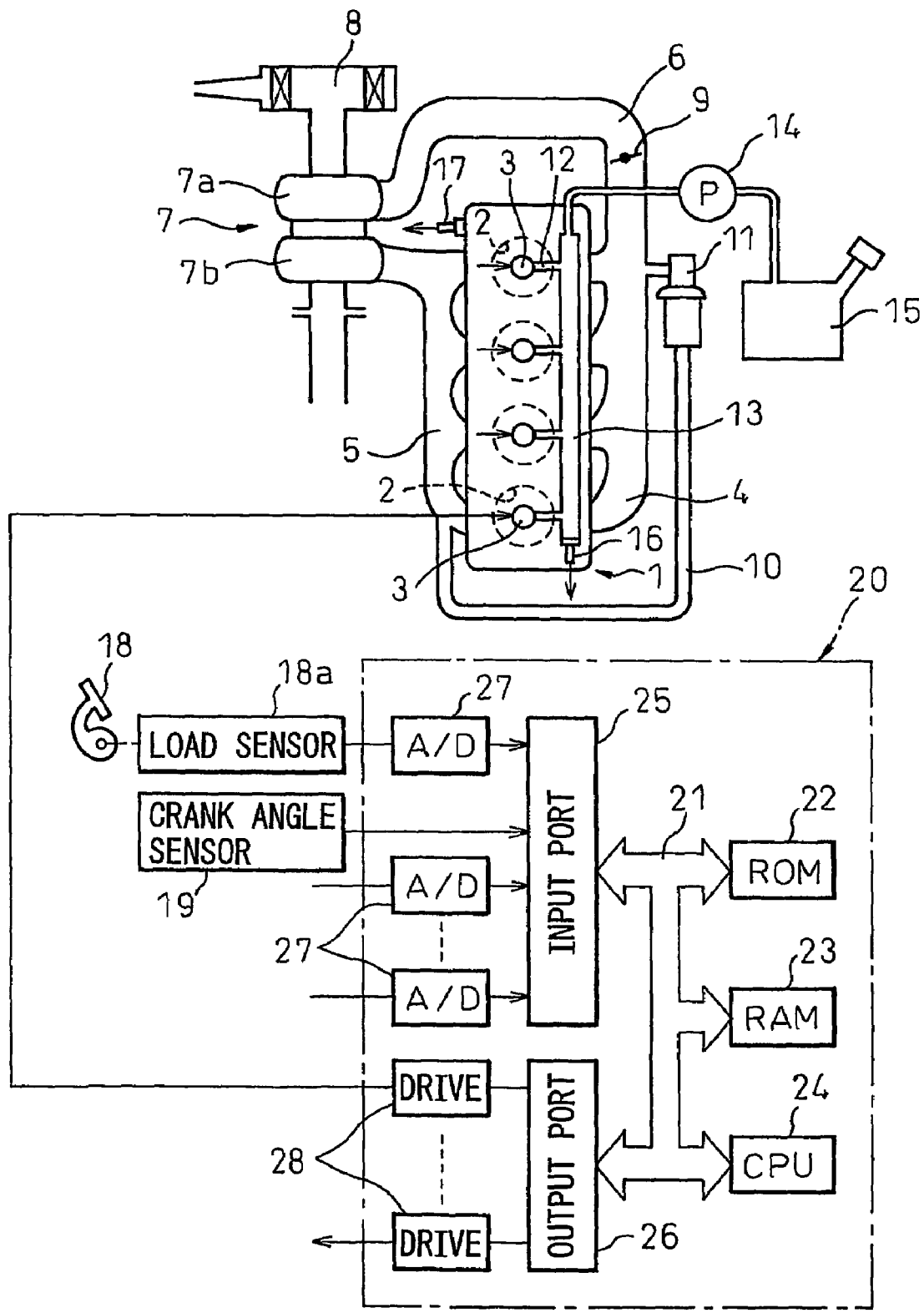
FIG. 1 is an overview of a compression ignition type internal combustion engine.

Referring to FIG. 1, 1 is a compression ignition type internal combustion engine body, 2 a combustion chamber of a cylinder, 3 a fuel injector for injecting fuel into a combustion chamber 2, 4 an intake manifold, and 5 an exhaust manifold. The intake manifold 4 is connected through an intake duct 6 to an outlet of a compressor 7a of an exhaust turbocharger 7. The inlet of the compressor 7a is connected to an air cleaner 8. The intake duct 6 has arranged inside it a throttle valve 9 driven by a step motor. On the other hand, the exhaust manifold 5 is connected to an inlet of an exhaust turbine 7b of the exhaust turbocharger 7.

The exhaust manifold 5 and the intake manifold 4 are connected to each other through an exhaust gas recirculation (hereinafter referred to as an "EGR") passage 10. The EGR passage 10 has an electronic control type EGR control valve 11 arranged in it. On the other hand, each fuel injector 3 is connected through a fuel feed line 12 to a common rail 13. The common rail 13 is supplied inside it with fuel from a fuel tank 15 by an electronic control type variable discharge fuel pump 14. The fuel supplied to the common rail 13 is supplied through the fuel feed lines 12 to the fuel injectors 3. The common rail 13 is provided with a fuel pressure sensor 16 for detecting the fuel pressure in the common rail 13. Based on the output signal of the fuel pressure sensor 16, the discharge of the fuel pump 14 is controlled so that the fuel pressure in the common rail 16 becomes the target fuel pressure. Further, the engine body 1 is provided with a water temperature sensor 17 for detecting the engine cooling water temperature.

An electronic control unit 20 is comprised of a digital computer and is provided with a ROM (read only memory) 22, RAM (random access memory) 23, CPU (microprocessor) 24, input port 25, and output port 26 all connected by a bidirectional bus 21. The output signals of the fuel pressure sensor 16 and the water temperature sensor 17 are input through corresponding AD converters 27 to the input port 25. On the other hand, an accelerator pedal 18 has a load sensor 18a connected to it to generate an output voltage proportional to the depression L of the accelerator pedal 18. The output voltage of the load sensor 18a is input through the corresponding AD converter 27 to the input port 25. Further, the input port 25 has a crank angle sensor 19 connected to it for generating an output pulse every time a crankshaft rotates by for example 15°. On the other hand, the output port 26 has connected to it the fuel injectors 3, a step motor for driving the throttle valve 9, the EGR control valve 11, and the fuel pump 14 through corresponding drive circuits 28.

Figure 2:
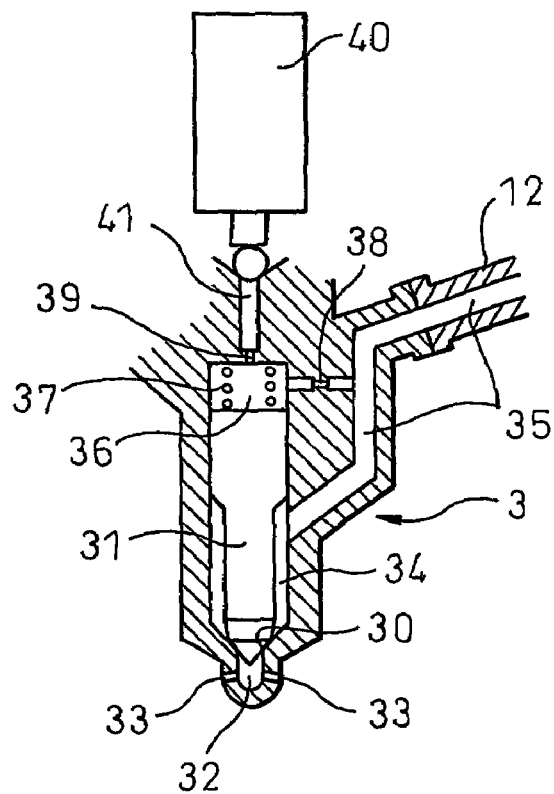
FIG. 2 is a side sectional view of a tip of a fuel injector.

FIG. 2 is an enlarged view of a fuel injector 3. As shown in FIG. 2, the fuel injector 3 is provided with a needle valve 31 able to sit on a valve seat 30, a suck chamber 32 formed around a tip of the needle valve 31, an injection port 33 extending from the suck chamber 32 to the inside of the combustion chamber 2, and a nozzle chamber 34 formed around the needle valve 31. The nozzle chamber 34 is connected to the common rail 13 through a high pressure fuel feed passage extending through the inside of the body of the fuel injector 3 and the inside of the fuel feed line 12, that is, the "high pressure line 35". The high pressure fuel in the common rail 13 is supplied through the high pressure line 35 to the inside of the nozzle chamber 34.

The fuel injector is formed inside it with a pressure control chamber 36 facing the back surface of the needle valve 31. The pressure control chamber 36 is provided inside it with a compression spring 37 pressing the needle valve 31 toward the valve seat 30. The pressure control chamber 36 is connected on the one hand through an inlet side constriction 38 to the middle of the high pressure line 35 and on the other hand through an outlet side constriction 39 to a fuel overflow port 41 controlled to open and close by an overflow control valve 40. The pressure control chamber 36 is continuously supplied with high pressure fuel through the constriction 38. Therefore, the pressure control valve 36 is filled with fuel.

When the fuel overflow port 41 is closed by the overflow control valve 40, as shown in FIG. 2, the needle valve 31 sits on the valve seat 30. Therefore, the fuel injection is stopped. At this time, the nozzle chamber 34 and the pressure control chamber 36 become the same fuel pressure. When the overflow control valve 40 opens, that is, it opens the fuel overflow port 41, the high pressure fuel in the pressure control chamber 36 flows out through a constriction 39 from the fuel overflow port 41 and therefore the pressure in the pressure control chamber 36 gradually flows. When the pressure in the pressure control chamber 36 falls, the needle valve 31 rises and the injection of the fuel from the injection port 33 is started.

That is, the pressure control chamber 36 and the fuel overflow port 41 are provided between them with a constriction 39. Further, due to other delay elements, the injection of fuel is started a little while after the overflow control valve 40 opens. Next, when the overflow control valve 40 closes, that is, it closes the fuel overflow port 41, the fuel supplied through the constriction 38 to the inside of the pressure control chamber 36 causes the pressure in the pressure control chamber 36 to gradually increase and therefore the fuel injection is stopped a little while after the overflow control valve 40 closes.

Figure 3A:
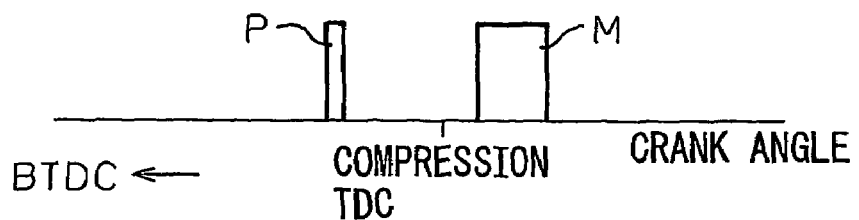
FIGS. 3A and 3B are views of injection patterns.
Figure 3B:
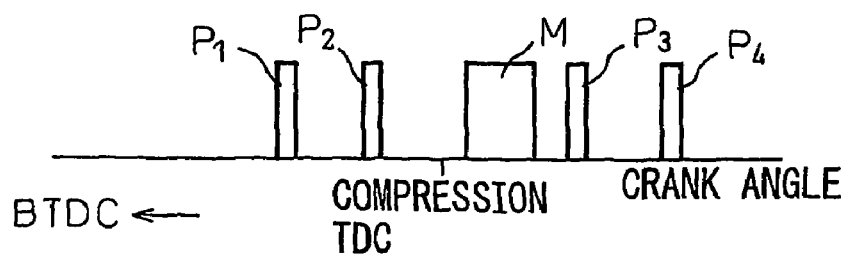

In the present invention, fuel is injected from each fuel injector at least two times, a prior injection and a later injection, during one cycle of the engine. FIGS. 3A and 3B show two representative fuel injection methods. FIG. 3A shows the case of performing a pilot injection P before a main injection M. In this case, the pilot injection P is the prior injection and the main injection M is the later injection.

On the other hand, FIG. 3B shows the case of performing a plurality of pilot injections $P_1$, $P_2$ before the main injection M and performing a plurality of post injections $P_3$, $P_4$ after the main injection M. In this case, if making the pilot injection $P_2$ the later injection, the pilot injection $P_1$ becomes the prior injection. If making the main injection M the later injection, the pilot injections $P_1$, $P_2$ become the prior injections. If making the pilot injection $P_3$ the later injection, the pilot injections $P_1$, $P_2$ and the main injection M become the prior injections.

Note that the present invention will be explained taking as an example the case of performing the pilot injection P before the main injection M as shown in FIG. 3A.

Figure 4A:
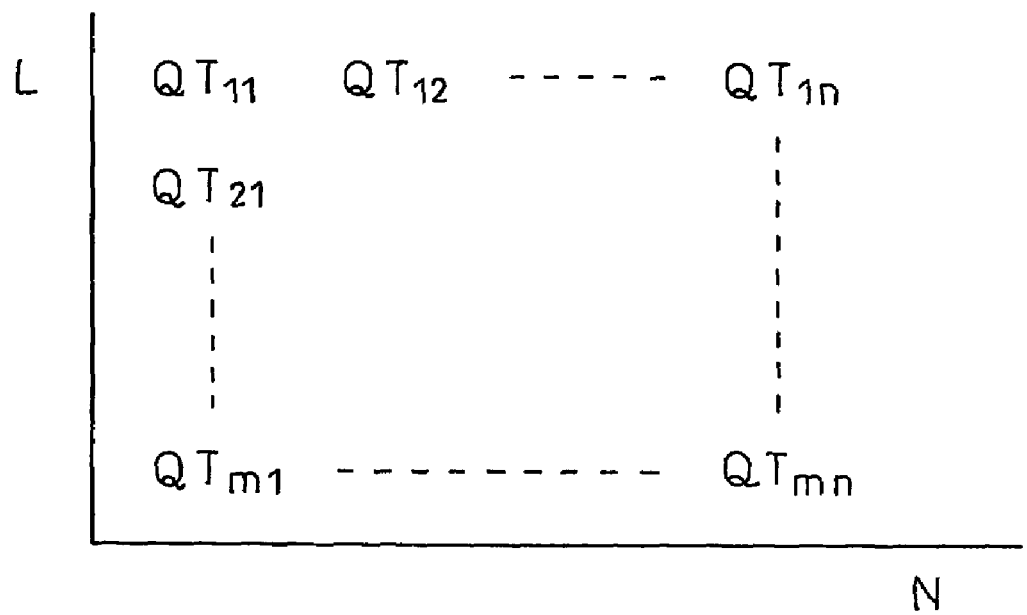
FIGS. 4A and 4B are views of maps of injection amounts.
Figure 4B:
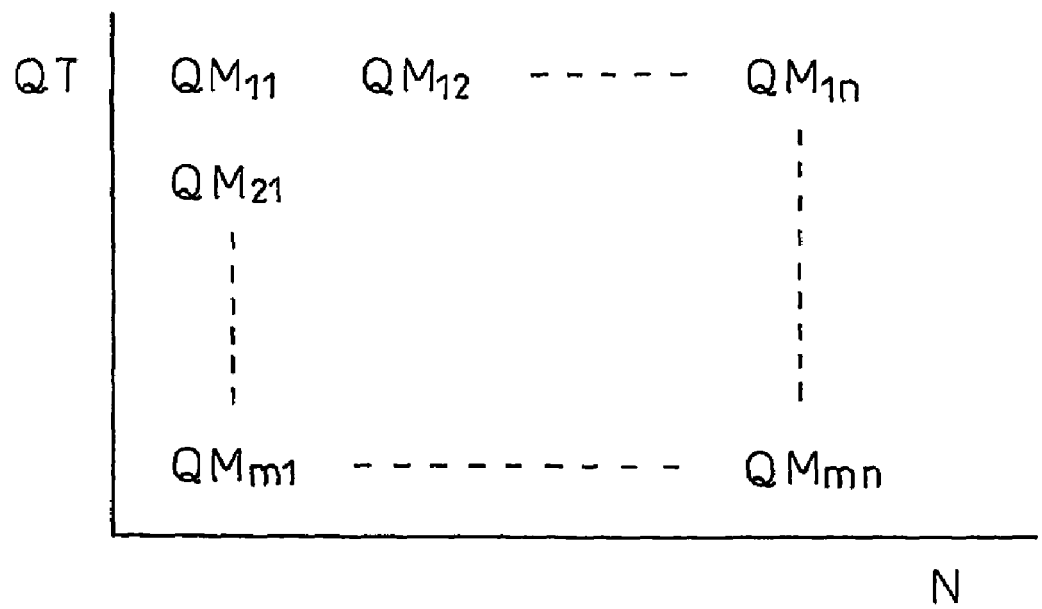

In the embodiment of the present invention, the target total injection amount QT is stored in advance in the ROM 22 in the form of a map as a function of the depression of the accelerator pedal 17, that is, the accelerator opening degree L, and the engine speed N as shown in FIG. 4A. Further, the target main injection amount QM is stored in advance in the ROM 22 in the form of a map as a function of the total injection amount QT and the engine speed N as shown in FIG. 4B. On the other hand, the target pilot injection amount QP is obtained by subtracting from the total injection amount QT the main injection amount QM.

Figure 5A:
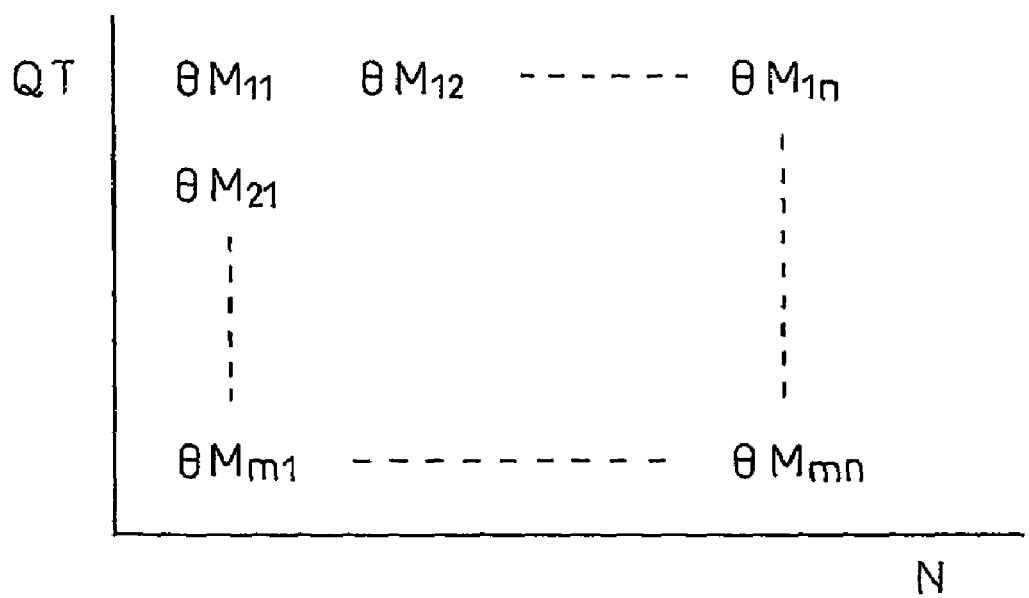
FIGS. 5A and 5B are views of maps of main injection timing etc.
Figure 5B:
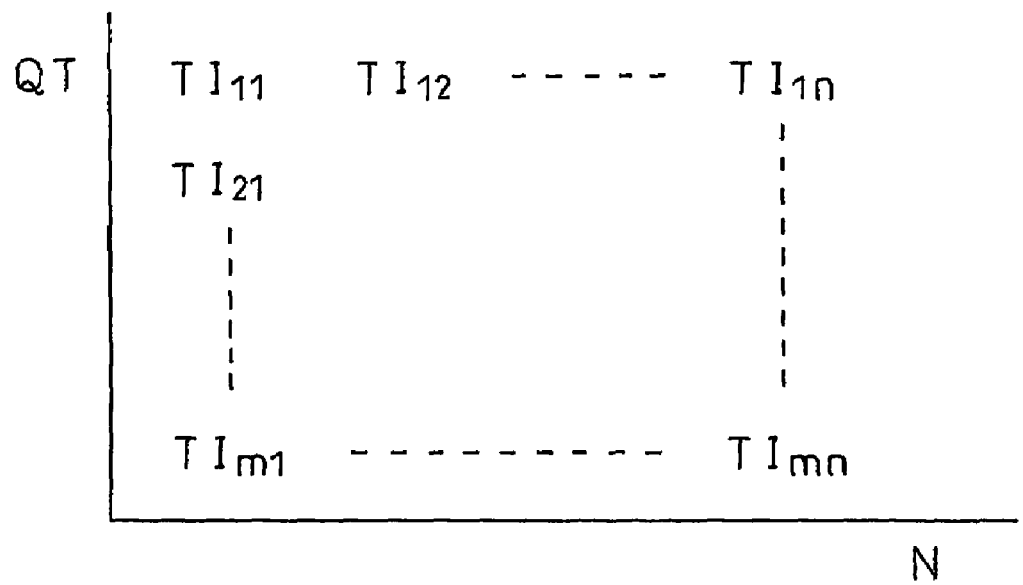

Further, the injection start timing θM of the main injection M is stored in advance in the ROM 22 in the form of a map as a function of the total injection amount QT and the engine speed N as shown in FIG. 5A. Further, the time interval from when the prior injection is performed to when the later injection is performed is set in advance. In this embodiment of the present invention, the time interval TI from when the pilot injection P is started to when the main injection M is started is stored in advance in the ROM 22 in the form of a map as a function of the total injection amount QT and the engine speed N as shown in FIG. 5B. The injection start timing θP of the pilot injection P is calculated from the injection start timing θM of the main injection M and the time interval TI.

Further, in this embodiment of the present invention, the target rail pressure in the common rail 13 is set in advance. This target rail pressure generally speaking becomes higher the greater the total injection amount QT.

Now, when the needle valve 31 opens and the fuel injection is started in FIG. 2, the pressure in the nozzle chamber 34 rapidly drops. If the pressure in the nozzle chamber 34 rapidly drops in this way, a pressure wave is produced. This pressure wave propagates through the inside of the high pressure line 35 toward the common rail 13. Next, this pressure wave is reflected at the open end of the high pressure line 35 leading toward the inside of the common rail 13. Next, this pressure wave proceeds through the high pressure line 35 toward the nozzle chamber 34 in the state with the pressure inverted with respect to the mean pressure, that is, in the form of a high pressure wave, and causes the nozzle chamber 34 to become high in pressure temporarily. For example, if pilot injection has been performed, for a little while after that, the inside of the nozzle chamber 34 becomes temporarily a high pressure due to the reflected wave in the common rail 13.

On the other hand, when the needle valve 31 closes, the flow of the fuel is rapidly blocked, so the pressure inside the nozzle chamber 34 temporarily rises and a pressure wave is formed. This pressure wave also propagates through the inside of the high pressure line 35, is reflected at the common rail 13, and returns to the inside of the nozzle chamber 34.

Further, the opening and closing operation of the overflow control valve 40 also causes generation of a pressure wave propagated through the inside of the nozzle chamber 34. That is, if the overflow control valve 40 opens, the pressure at the fuel overflow port 41 rapidly falls, so a pressure wave is generated. If the overflow control valve 40 closes, the pressure of the fuel overflow port 41 rapidly rises, so a pressure wave is generated. These pressure waves pass through the pair of constrictions 39, 38 to be propagated through the nozzle chamber 34 and cause the pressure in the nozzle chamber 34 to rise or fall. Simultaneously, the pressure waves are reflected in the nozzle chamber 34 and are propagated toward the common rail 13 or the fuel overflow port 41.

In this way, if pilot injection P is performed, the pressure waves generated due to the opening and closing operation of the needle valve 31 and the opening and closing operation of the overflow control valve 40 cause the fuel pressure in the nozzle chamber 34 to pulsate. Next, main injection M is performed when the fuel pressure in the nozzle chamber 34 is pulsating in this way. However, if main injection M is performed when the fuel pressure in the nozzle chamber 34 is pulsating in this way, the injection amount will increase when the fuel pressure in the nozzle chamber 34 becomes higher and the injection amount will decrease when the fuel pressure in the nozzle chamber 34 becomes lower, so the injection amount of the main injection M will fluctuate.

Next, a method of utilizing the fluctuation in the injection amount of the main injection M to judge the fuel properties will be explained.

FIGS. 6A and 6B and FIGS. 7A and 7B show the fluctuation amount of the injection amount of the main injection M when the rail pressure is maintained at a predetermined rail pressure, for example, 48 MPa, during engine idling operation. Note that in FIGS. 6A and 6B and FIGS. 7A and 7B, the abscissa Ti shows the time interval (msec) from when the pilot injection P was started to when the main injection M is started, while the ordinate dQ shows the fluctuation amount (mm$^3$) of the injection amount of the main injection M with respect to the target value.

Now, the curves shown in FIGS. 6A and 6B and FIGS. 7A and 7B show actual fluctuation amounts dQ of the injection amount of the main injection M with respect to the target value. As explained above, if the fuel pressure in the nozzle chamber 34 becomes higher, the main injection amount increases, while if the fuel pressure in the nozzle chamber 34 becomes lower, the main injection amount decreases, so it is learned from FIGS. 6A and 6B and FIGS. 7A and 7B that after the pilot injection, the fuel pressure in the nozzle chamber 34 repeatedly rises and falls, that is, pulsates.

However, as explained above, the fuel pressure in the nozzle chamber 34 fluctuates due to the pressure wave propagated between the nozzle chamber 34 and common rail 13 or between the nozzle chamber 34 and the fuel overflow port 41. The distance between the nozzle chamber 34 and the common rail 13 is a fixed length and the distance between the nozzle chamber 34 and fuel overflow port 41 is also a fixed length, so if the propagation speed of the pressure wave is constant, the fuel pressure generated in the nozzle chamber 34 after the pilot injection P is performed will pulsate by a set fluctuation pattern.

However, the propagation speed of a pressure wave changes depending on the fuel properties, fuel pressure, and fuel temperature. That is, the propagation speed of the pressure wave is expressed by the square root of $(E/\gamma) \cdot g$ where E is the volume elasticity, $\gamma$ is the density of the fuel, and g is the acceleration of gravity. That is, the propagation speed of the pressure wave is proportional to the square root of the volume elasticity E and inversely proportional to the square root of the density $\gamma$ of the fuel. If the properties of the fuel used differ, the volume elasticity E and the density $\gamma$ will change, so the propagation speed of the pressure wave will change. Further, the volume elasticity E is proportional to the fuel pressure and inversely proportional to the fuel temperature. Therefore, the propagation speed of the pressure wave becomes faster the higher the fuel pressure and becomes slower the higher the fuel temperature. That is, the propagation speed of the pressure wave becomes faster the higher the rail pressure.

Figure 6A:
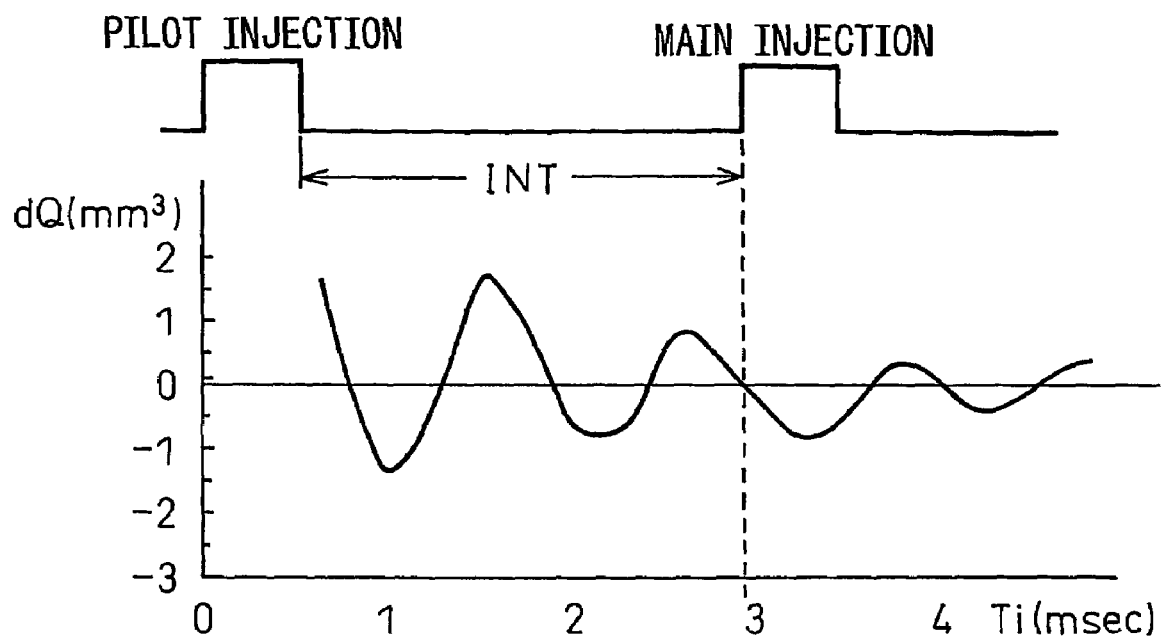
FIGS. 6A and 6B are views of fluctuation amounts of main injection.
Figure 6B:
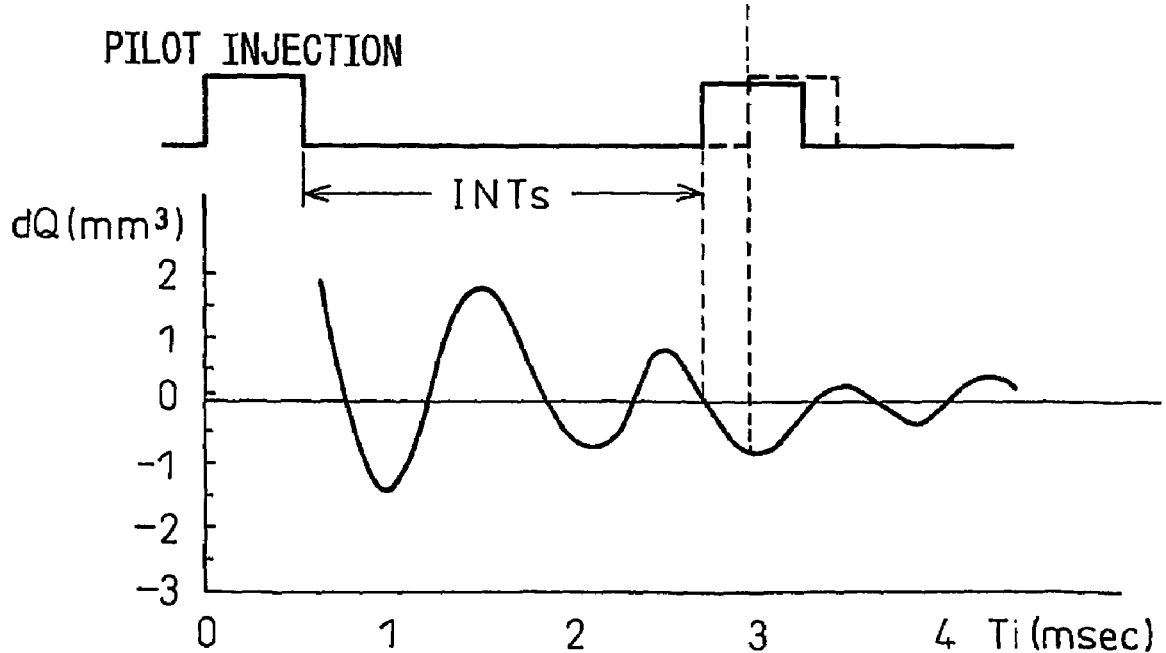
Figure 7A:
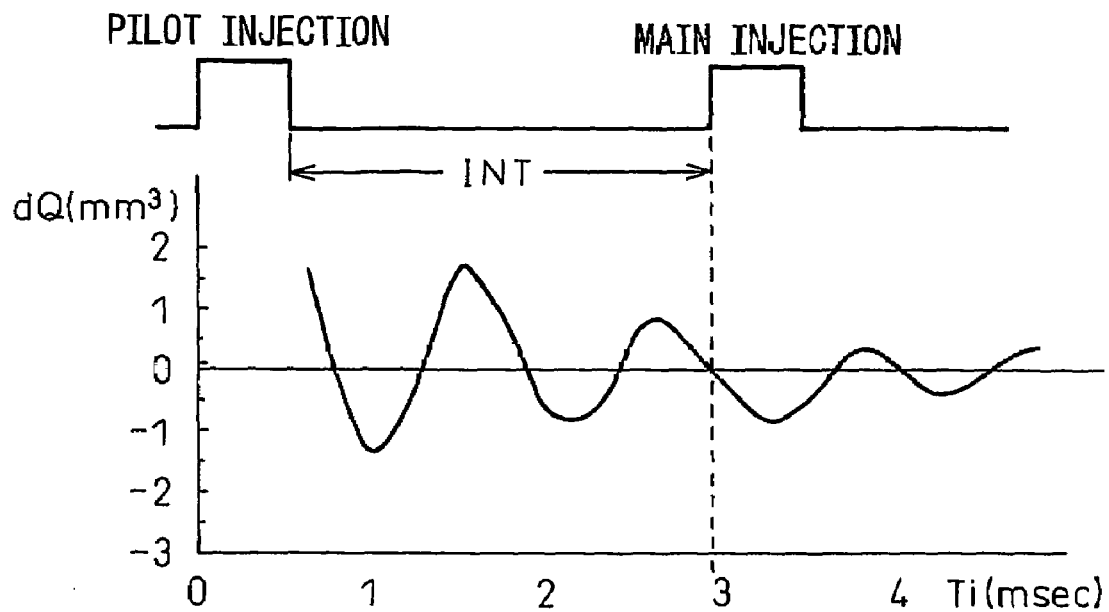
FIGS. 7A and 7B are views of fluctuation amounts of main injection.

FIG. 6A and FIG. 7A show the fluctuation amount dQ of the main injection M when using fuel serving as the reference and with known fuel properties as the fuel. On the other hand, FIG. 6B shows the fluctuation amount dQ of the main injection M when using fuel of properties with a faster propagation speed than the fuel serving as the reference. If the propagation speed becomes faster, the fluctuation pattern of the fluctuation amount dQ of the main injection M becomes the overall reference fluctuation pattern shown in FIG. 6A contracted in the time axis direction of the time interval Ti based on the time of the end of the pilot injection.

Figure 7B:
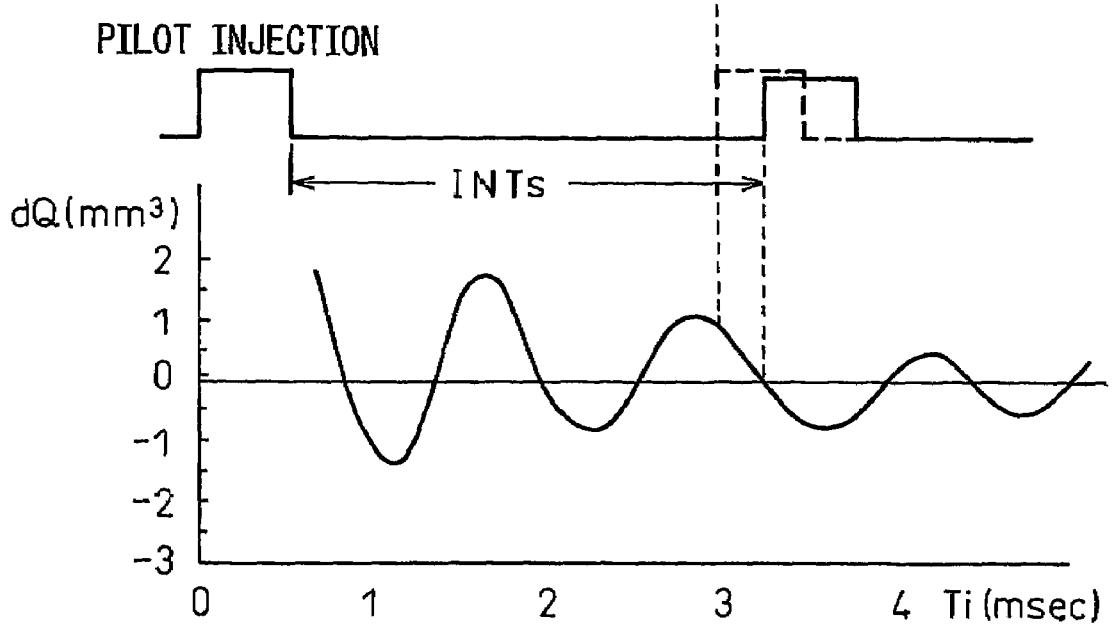

On the other hand, FIG. 7B shows the fluctuation amount dQ of the main injection M when using fuel of properties with a slower propagation speed than the fuel serving as the reference. If the propagation speed becomes slower, the fluctuation pattern of the fluctuation amount dQ of the main injection M becomes the overall reference fluctuation pattern shown in FIG. 7A expanded in the time axis direction of the time interval Ti based on the time of the end of the pilot injection.

Now, in the present invention, when judging the properties of the fuel, as a preparatory stage, first the fuel serving as the reference is used, the pilot injection amount and the main injection amount are made the same as shown in FIG. 6A and FIG. 7A, and the main injection M is started when the fluctuation amount dQ of the main injection M is the reference value. In the example shown in FIG. 6A and FIG. 7A, the reference value is made zero. Therefore, in FIG. 6A and FIG. 7A, the main injection M is started when the fluctuation amount of the main injection M is zero. The time interval INT from the end of the pilot injection to the start of the main injection at this time is called the "reference time interval". This reference time interval is stored in advance.

In this way, in the example shown in FIG. 6A and FIG. 7A, since the main injection M is started when the fluctuation amount of the main injection M is zero, the actually injected main injection amount matches with the predetermined main injection amount. In other words, when there is a single pilot injection, the main injection amount is made ½ of the total injection amount predetermined for judging the fuel properties. The total injection amount QS predetermined for judging the fuel properties is the injection amount required for making the engine speed N the target idling speed NS at the time of idling operation. The target idling speed NS differs depending on the engine cooling water temperature TW. Therefore, as shown in FIG. 8A, the target idling speed NS and the total injection amount QS become functions of the engine cooling water temperature TW.

Figures 8A, 8B:
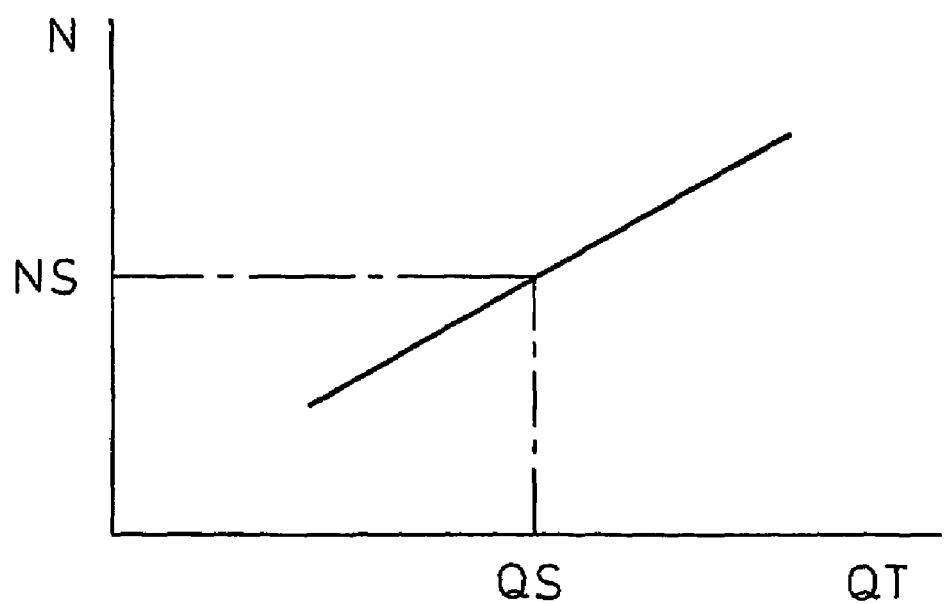
FIGS. 8A and 8B are views of the relationship of an engine cooling water temperature, target idling speed, and total injection amount.

FIG. 8B shows the relationship between the total injection amount QT and the engine speed N. As shown in FIG. 8B, when the total injection amount QT is made the total injection amount QS for judging the fuel properties, the engine speed N becomes the target engine speed NS. Further, as will be understood from FIG. 8B as well, at this time, if the total injection amount becomes smaller than QS, the engine speed will become lower than the target idling speed NS, while if the total injection amount becomes greater than QS, the engine speed will become higher than the target idling speed NS. When judging the fuel properties, the main injection is started when the reference time interval Ti has elapsed after the end of the pilot injection. The pilot injection amount and the main injection amount at this time become ½ of the total injection amount QS respectively. If the fuel serving as the reference has been used at this time, as shown in FIG. 6A and FIG. 7A, the fluctuation amount dQ of the main injection at the time of start of the main injection becomes zero. Therefore, the main injection amount at this time becomes QS/2 and therefore the engine speed N becomes the target idling speed NS.

On the other hand, if fuel having properties with a faster propagation speed of the pressure wave compared with the fuel serving as the reference has been used as the fuel at this time, as shown by the broken line in FIG. 6B, when main injection is performed, the fluctuation amount dQ of the main injection at the start of main injection becomes a minus value. That is, the actual main injection amount becomes smaller than QS/2 and the total injection amount becomes smaller than QS. If the total injection amount becomes smaller than QS, as will be understood from FIG. 8B, the engine speed N will become lower than the target idling speed NS. That is, if the engine speed N becomes lower than the target idling speed NS, it is learned that the total injection amount becomes smaller than QS, that is, as shown by FIG. 6B, the fluctuation pattern of the fluctuation amount dQ is contracted in the time axis direction of the time interval Ti compared with the reference fluctuation pattern shown in FIG. 6A.

Next, in the embodiment of the present invention, the time interval is gradually changed so that the main injection amount becomes QS/2, that is, the engine speed N becomes the target idling speed NS. In other words, the time interval is gradually changed so that the main injection is started at a position on the fluctuation pattern corresponding to the reference value on the fluctuation pattern of the fluctuation amount dQ at the time of the start of the main injection of FIG. 6A. Therefore, it is learned that the time interval should be made shorter. That is, in this embodiment of the present invention, when the engine speed N is lower than the target idling speed NS, the time interval Ti is gradually shortened from the reference time interval INT, and the time interval INTs where the fluctuation amount dQ of the main injection becomes the reference value, that is, the time interval INTs where the engine speed N becomes the target speed NS, is found.

On the other hand, when fuel having properties with a slower propagation speed of the pressure wave compared with the fuel serving as the reference has been used as the fuel, as shown by the broken line in FIG. 7B, when main injection is performed, the fluctuation amount dQ of the main injection at the start of main injection becomes a plus value. That is, the actual main injection amount becomes larger than QS/2 and the total injection amount becomes larger than QS. If the total injection amount becomes larger than QS, as will be understood from FIG. 8B, the engine speed N will become higher than the target idling speed NS. That is, if the engine speed N becomes higher than the target idling speed NS, it is learned that the total injection amount becomes larger than QS, that is, as shown by FIG. 7B, the fluctuation pattern of the fluctuation amount dQ becomes expanded in the time axis direction of the time interval Ti compared with the reference fluctuation pattern shown in FIG. 7A.

Next, in the embodiment of the present invention, the time interval is gradually changed so that the main injection amount becomes QS/2, that is, the engine speed N becomes the target idling speed NS. In other words, the time interval is gradually changed so that the main injection is started at a position on the fluctuation pattern corresponding to the reference value on the fluctuation pattern of the fluctuation amount dQ at the time of the start of the main injection of FIG. 7A. Therefore, it is learned that the time interval should be made longer. That is, in this embodiment of the present invention, when the engine speed N is higher than the target idling speed NS, the time interval Ti is gradually increased from the reference time interval INT, and the time interval INTs where the fluctuation amount dQ of the main injection becomes the reference value, that is, the time interval INTs where the engine speed N becomes the target speed NS, is found.

When the propagation speed becomes faster, as shown in FIG. 6B, the time interval INTs becomes shorter, while when the propagation speed becomes slower, as shown in FIG. 7B, the time interval INTs becomes longer. Therefore, the time interval ratio (INT/INTs) of the reference time interval INT and the time interval INTs expresses the propagation speed ratio VR. If multiplying the propagation speed $V_0$ of the fuel serving as the reference with this propagation speed ratio VR, it is possible to calculate the propagation speed V of the fuel used.

If the propagation speed V of the fuel is calculated, the fuel properties can be estimated from this propagation speed. The control constant of the engine is modified based on the estimated fuel properties. That is, if the propagation speed is known, the fuel properties such as the volume elasticity E and density $\gamma$ of the fuel can be estimated and the control constants such as the engine compliance constant affected by the fuel properties can be modified so that the emission is improved and the vehicle operability is improved.

Next, a routine for judgment of the fuel properties will be explained while referring to FIG. 9.

Referring to FIG. 9, first, at step 50, whether the condition for judgment of the fuel properties stands or not is judged. When the engine operating state is a predetermined operating state, in this embodiment of the present invention, the condition for judgment is judged to stand at the time of engine idling operation after the end of warmup. When the condition for judgment stands, the routine proceeds to step 51.

At step 51, the target idling speed NS in accordance with the engine cooling water temperature TW is calculated from the relationship shown in FIG. 8A, then at step 52, the total injection quantity QS in accordance with the engine cooling water temperature TW is calculated from the relationship shown in FIG. 8A. Next, at step 53, ½ of the total injection amount QS is made the pilot injection amount QP and the main injection amount QM. Next, at step 54, the basic time interval INT is made the time interval INTs and the main injection is started in accordance with this time interval INTs. Next, at step 55, whether a fixed time has elapsed is judged. When the fixed time has elapsed, the routine proceeds to step 56.

At step 56, whether the engine speed N is larger than the target idling speed NS plus a small value a (NS+$\alpha$) is judged. When N>NS+$\alpha$, the routine proceeds to step 57, where the time interval INTs is increased by a fixed value $\Delta$INT and the routine returns to step 56. Therefore, so long as N>NS+$\alpha$, the time interval INTs continues to increase.

On the other hand, when it is judged at step 56 that N$\leq$NS+$\alpha$, the routine proceeds to step 58, where whether the engine speed N is smaller than the target idling speed NS minus the small value $\beta$ (NS−$\beta$) is judged. When N<NS−$\beta$, the routine proceeds to step 59, where the time interval INTs is decreased by the fixed value $\Delta$INT and the routine returns to step 56. Therefore, so long as N<NS−$\beta$, the time interval INTs continues to be shortened.

On the other hand, when it is judged at step 58 that N$\geq$NS−$\beta$, that is, when the engine speed N becomes the target idling speed NS, the routine proceeds to step 60, where the time interval ratio (INT/INTs) of the basic time interval INT and the time interval INTs is made the propagation speed ratio VR. Next, at step 61, the propagation speed $V_0$ of the fuel serving as the reference is multiplied with the propagation speed ratio VR to calculate the propagation speed V of the fuel used. Next, at step 62, the fuel properties are estimated from this propagation speed V and the control constant of the engine is modified based on the estimated fuel properties.

Next, an embodiment of controlling the fuel injection using this propagation speed ratio VR will be explained.

Figure 10A:
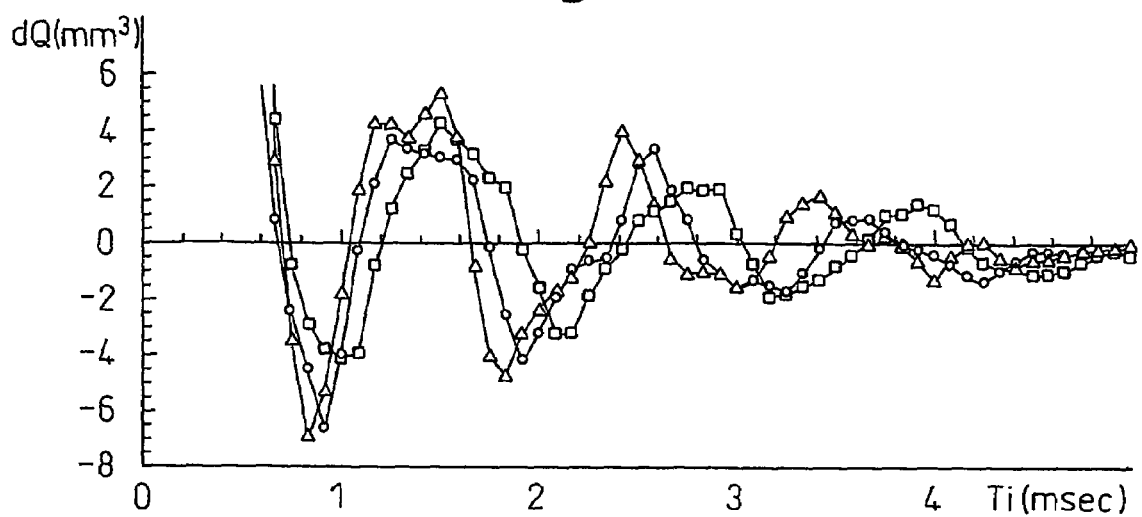
FIGS. 10A to 10C are views of fluctuation amounts of main injection.
Figure 10B:
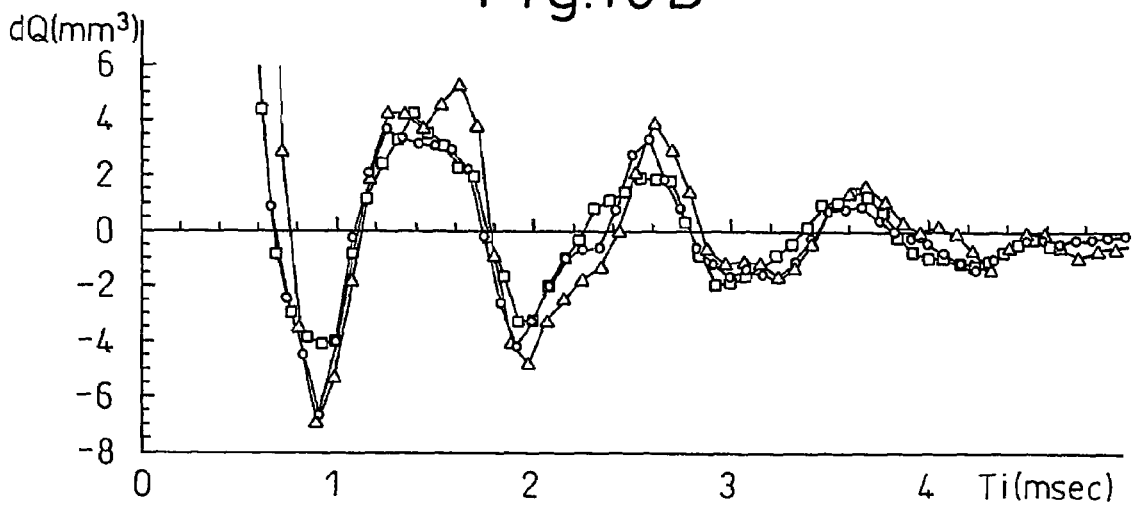
Figure 10C:
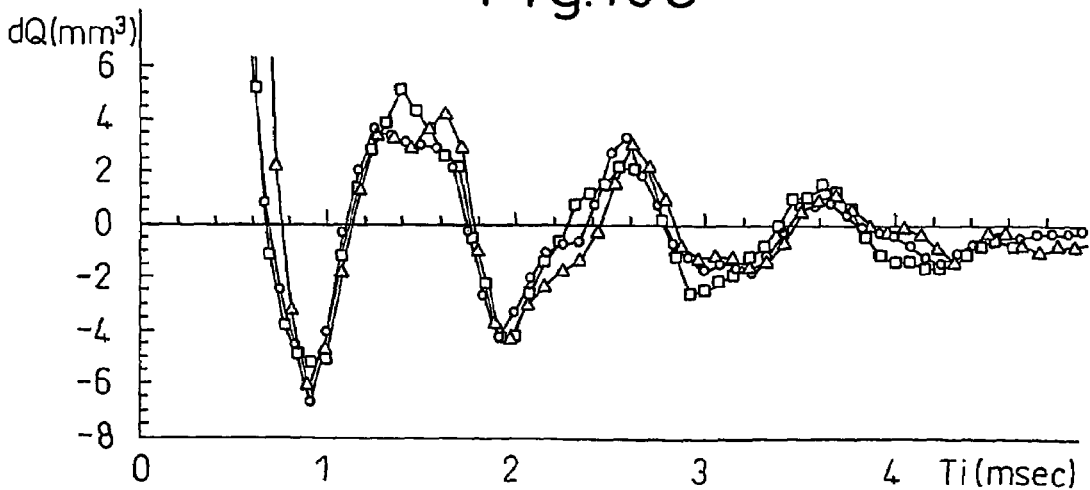

FIGS. 10A to 10C show the fluctuation amount of the main injection with respect to three different rail pressures. That is, in FIGS. 10A to 10C similar to FIGS. 6A and 6BA and FIGS. 7A and 7B, the abscissa Ti shows the time interval (msec) from when the pilot injection P has been started to when the main injection M is started, while the ordinate dQ shows the fluctuation amount (mm³) of the injection amount of the main injection M with respect to the target value. Further, in FIGS. 10A to 10C, the □ marks show when the rail pressure is 48 MPa, the ○ marks show when the rail pressure is 80 MPa, and the Δ marks show when the rail pressure is 128 MPa. Note that FIG. 10A shows the actual fluctuation amount dQ of the injection amount of the main injection M with respect to the target value for three different rail pressures. Looking at FIG. 10A, it will be understood that the fluctuation patterns of the main injection amounts shown by the curves differ in period, that is the higher the rail pressure, the shorter the period, but rise and fall in the same manners.

In this way, when the rail pressure becomes higher, the period of fluctuation of the fuel pressure in the nozzle chamber 34 becomes shorter. At this time, the fuel pressure in the nozzle chamber 34 fluctuates in a form with the fluctuation pattern contracted in the abscissa direction in FIG. 10A, that is, in the time interval axis direction. Therefore, as shown in FIG. 10A, the higher the rail pressure, the more the injection amount dQ of the main injection fluctuates in a form with the fluctuation pattern contracted in the time interval axis direction.

If making the rail pressure 80 MPa shown by the ○ marks in FIG. 10A the reference rail pressure and making the fluctuation pattern of the fluctuation amount dQ of the main injection at the time of this reference rail pressure the reference fluctuation pattern, at the time of the rail pressure 48 MPa shown by the □ marks, that is, when the rail pressure is lower than the reference rail pressure, if the overall fluctuation pattern of the fluctuation amount dQ of the main injection is uniformly contracted in the time interval axis direction using the timing of the end of the pilot injection as the fixed point, the timing of upward and downward fluctuation of the fluctuation pattern will match the timing of upward and downward fluctuation of the reference fluctuation pattern. At the time of the rail pressure 128 MPa shown by the Δ marks, that is, when the rail pressure is higher than the reference rail pressure, if the overall fluctuation pattern of the fluctuation amount dQ of the main injection is uniformly expanded in the time interval axis direction using the timing of the end of the pilot injection as the fixed point, the timing of upward and downward fluctuation of the fluctuation pattern will match the timing of upward and downward fluctuation of the reference fluctuation pattern. FIG. 10B shows the case when making the fluctuation pattern contract when the rail pressure is 48 MPa and making the fluctuation pattern expand when the rail pressure is 128 MPa so that the period of upward and downward fluctuation of the fluctuation pattern matches the period of upward and downward fluctuation of the reference fluctuation pattern in this way.

If making the fluctuation pattern at each rail pressure contract or expand in this way, it is possible to overlay each fluctuation pattern on the reference fluctuation pattern. That is, it becomes possible to standardize each fluctuation pattern to a common reference fluctuation pattern. When it is possible to standardize each fluctuation pattern to a common fluctuation pattern in this way, it is possible to modify the time interval by the contraction rate or expansion rate of each fluctuation pattern and use the modified time interval to find the fluctuation amount dQ of the main injection at each rail pressure from the common reference fluctuation pattern.

For example, if making the fluctuation pattern of the fluctuation amount dQ of the main injection when the rail pressure is 80 MPa in FIG. 10A the common reference fluctuation pattern, the fluctuation amount dQ of the main injection at each time interval Ti when the rail pressure is 48 MPa matches with the reference fluctuation amount dQ of the main injection at the reference fluctuation pattern when contracting the time interval Ti by the contraction rate of the fluctuation pattern at the time of 48 MPa. That is, the contraction rate or expansion rate of the fluctuation pattern at each rail pressure is multiplied with the time interval Ti to obtain the modified time interval. The reference fluctuation amount dQ at the reference fluctuation pattern in accordance with that modified time interval matches with the fluctuation amount dQ of the main injection at each rail pressure. If using the modified time interval in this way, if storing only the reference fluctuation amount dQ of the main injection at the reference fluctuation pattern, it is possible to find the fluctuation amount dQ of the main injection at each rail pressure from this reference fluctuation amount dQ.

That is, in this embodiment of the present invention, the reference fluctuation amount of the later injection, changing along with the reference fluctuation pattern along with an increase in the time interval Ti when the rail pressure is a predetermined reference rail pressure, is stored in advance. Further, the contraction rate or expansion rate of the fluctuation pattern when contracting or expanding the fluctuation pattern of the fluctuation amount of the later injection to overlay it on the reference fluctuation pattern when the rail pressure is not the reference rail pressure is stored in advance. Using the contraction rate or expansion rate, the fluctuation amount of the later injection in accordance with the rail pressure is calculated from the reference fluctuation amount and time interval Ti.

Specifically speaking, the reference fluctuation amount dQ of the later injection at the reference rail pressure is stored in advance as a function of the time interval Ti. The contraction rate or expansion rate of each fluctuation pattern when overlaying the fluctuation pattern at a representative rail pressure on the reference fluctuation pattern is stored in advance. By multiplying the contraction rate or expansion rate of the fluctuation pattern at the current rail pressure with the time interval Ti, the modified time interval is found. The reference fluctuation amount dQ of the later injection in accordance with this modified time interval is made the fluctuation amount of the later injection at the current rail pressure.

As shown in FIG. 10B, the fluctuation amount dQ of the main injection at the same time interval Ti becomes greater the higher the rail pressure. Therefore, to standardize the fluctuation pattern at each rail pressure to the common reference fluctuation pattern, it is preferable to contract or expand the fluctuation pattern at each rail pressure in accordance with the rail pressure in the ordinate direction of FIG. 10B, that is, in the direction increasing or decreasing the fluctuation amount dQ of the main injection. FIG. 10C shows the case of contracting or expanding the fluctuation pattern at each rail pressure in the direction increasing or decreasing the fluctuation amount dQ of the main injection to overlay it on the reference fluctuation pattern.

In this embodiment of the present invention, the contraction rate or expansion rate of the fluctuation pattern when contracting or expanding the fluctuation pattern of the fluctuation amount of the later injection to overlay it on the reference fluctuation pattern is stored for each rail pressure.

In FIG. 10B, by multiplying the reference fluctuation amount dQ when the rail pressure is 80 MPa with the reciprocal of the contraction rate or reciprocal of the expansion rate, the fluctuation amount dQ of the main injection at each rail pressure is calculated.

Figure 11A:
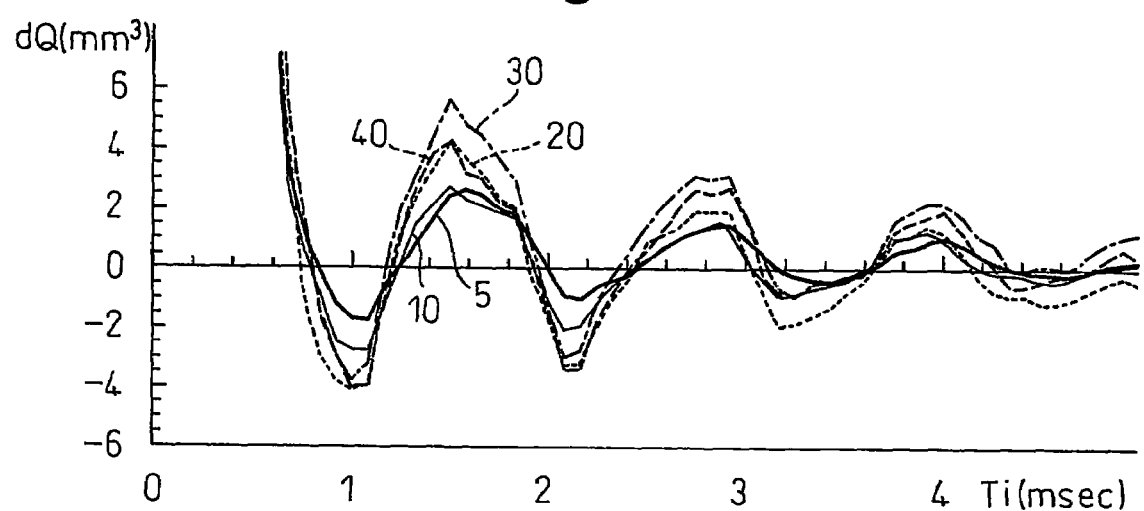
FIGS. 11A and 11B are views of fluctuation amounts of main injection.
Figure 11B:
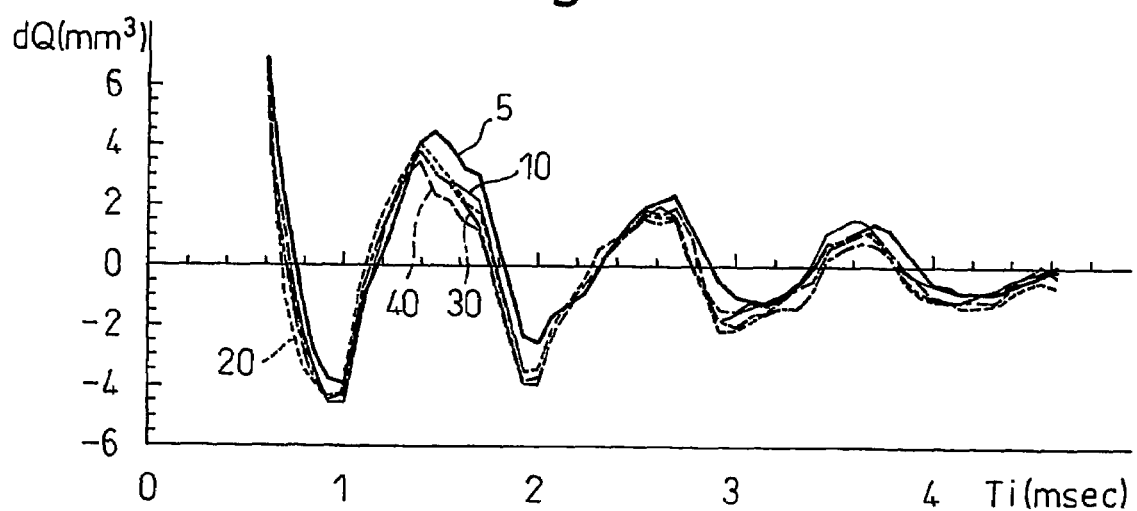

FIG. 11A shows the fluctuation amount dQ of the main injection when making the injection amount of the main injection 5 ($mm^3$), 10 ($mm^3$), 20 ($mm^3$), 30 ($mm^3$), and 40 ($mm^3$) in the state maintaining the rail pressure at 48 MPa. Even when the time interval Ti is the same, if the fluctuation amount of the main injection changes, that is, the injection timing changes, the region of the fluctuation pattern affecting the injection changes, so the fluctuation amount dQ of the main injection changes in accordance with the fluctuation amount of the main injection. In this case, the fluctuation amount dQ of the main injection at the same time interval Ti generally speaking becomes larger the greater the injection amount of the main injection. Therefore, to standardize the fluctuation pattern at each rail pressure to the common reference fluctuation pattern, it is preferable to contract or expand the fluctuation pattern at each rail pressure in the ordinate direction of FIG. 11A, that is, in the direction increasing or decreasing the fluctuation amount dQ of the main injection. FIG. 11B shows the case of contracting or expanding the fluctuation pattern at each rail pressure in the direction increasing or decreasing the fluctuation amount dQ of the main injection to overlay it on the reference fluctuation pattern.

In this case, in this embodiment of the present invention, the contraction rate or expansion rate of the fluctuation pattern when contracting or expanding the fluctuation pattern of the fluctuation amount of the later injection to overlay it on the reference fluctuation pattern is stored for each injection amount of the main injection. In FIG. 11A, by multiplying the reference fluctuation amount dQ when the injection amount is 20 ($mm^3$) with the reciprocal of the contraction rate or reciprocal of the expansion rate, the fluctuation amount dQ of the main injection is calculated.

On the other hand, FIGS. 10A to 10C and FIGS. 11A to 11B show the fluctuation amount dQ of the main injection in the case of using fuel serving as the reference. To find the fluctuation amount dQ of the main injection from the fluctuation pattern serving as a reference when the properties of the fuel differ from the properties of the fuel serving as the reference, as will be understood from FIGS. 6A and 6B and FIGS. 7A and 7B, the time interval Ti is multiplied with the reciprocal of the time interval ratio, that is, the reciprocal of the propagation speed ratio VR, to find the modified time interval Ti. The reference fluctuation value on the reference fluctuation pattern based on this modified time interval Ti becomes the fluctuation value sought.

Next, an example of the fuel injection control for controlling the fuel injection to a target value will be explained with reference to the fuel injection control routine shown in FIG. 12.

Figure 12:
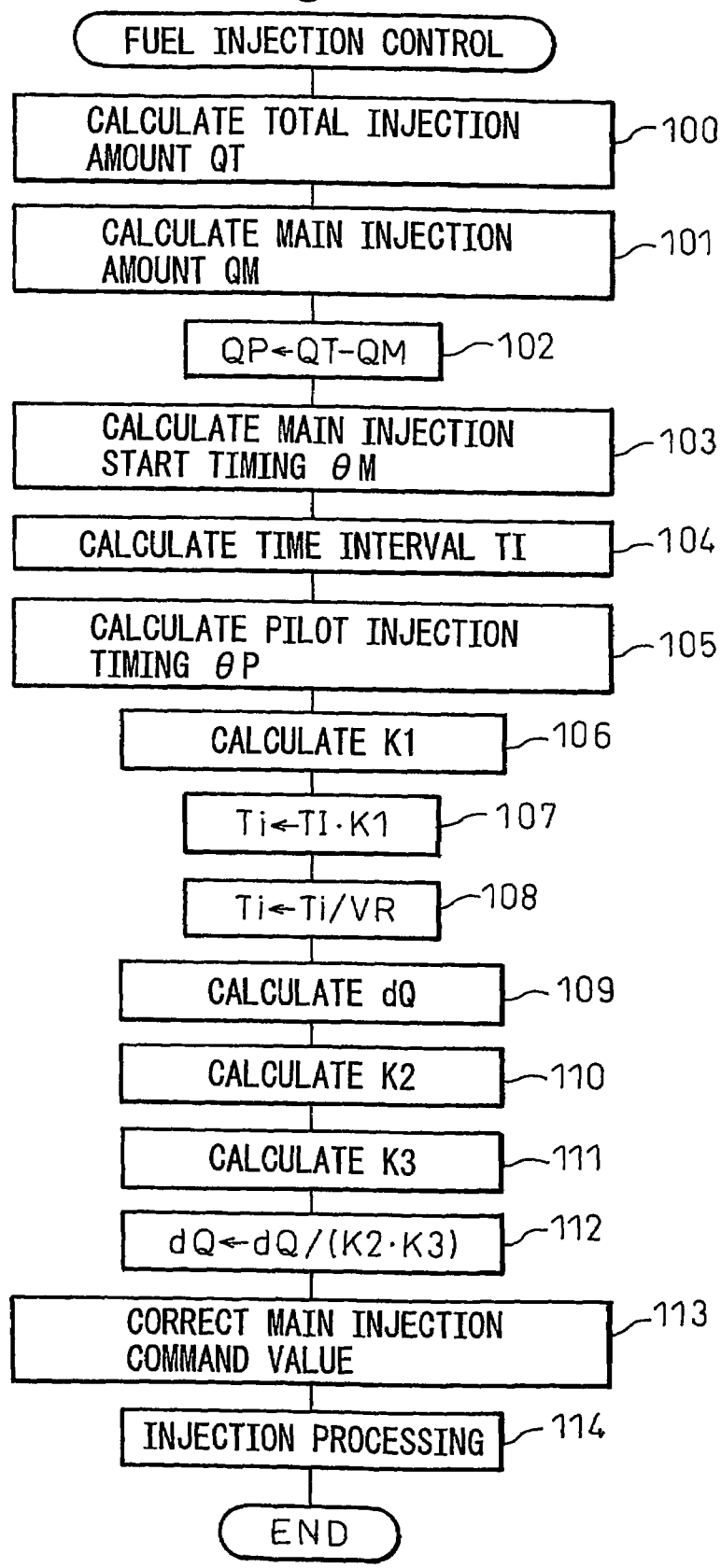
FIG. 12 is a flow chart of fuel injection control.

Referring to FIG. 12, first, at step 100, the total injection amount QT is calculated from the map shown in FIG. 4A. Next, at step 101, the main injection amount QM is calculated from the map shown in FIG. 4B. Next, at step 102, the total injection amount QT is subtracted by the main injection amount QM to calculate the pilot injection amount QP. Next, at step 103, the main injection start timing θM is calculated from the map shown in FIG. 5A. Next, at step 104, the time interval TI is calculated from the map shown in FIG. 5B. Next, at step 105, the pilot injection start timing θP is calculated from the main injection start timing θM and the time interval TI.

Figure 13A:
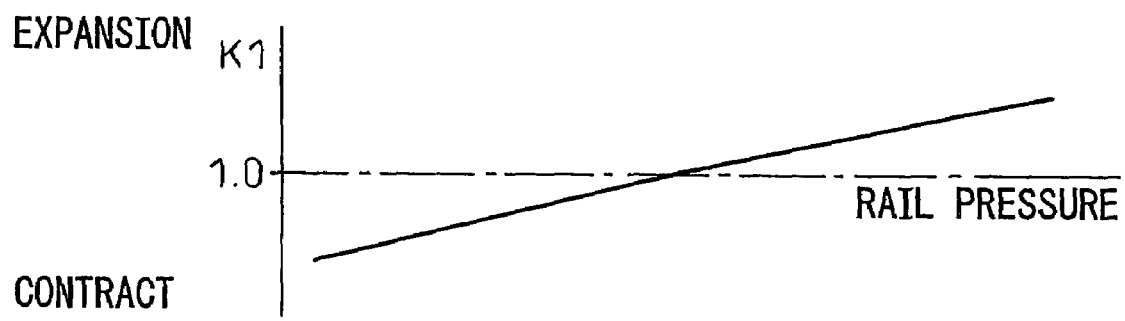
FIGS. 13A to 13C are views of contraction rates or expansion rates.

Next, at step 106, the contraction rate or expansion rate K1 when contracting or expanding the fluctuation pattern of the fluctuation amount dQ of the main injection amount in a direction increasing or reducing the time interval in accordance with the rail pressure based on the rail pressure detected by the fuel pressure sensor 16 or the mean value of the rail pressure in a fixed time (hereinafter referred to simply as the "rail pressure") to overlay it on the reference fluctuation pattern is calculated. This contraction rate or expansion rate K1 is shown in FIG. 13A. If the reference rail pressure is 80 MPa, when the rail pressure is near 80 MPa, the contraction rate or expansion rate K1 is 1.0. As the rail pressure becomes lower than the reference rail pressure, K1 decreases, that is, the fluctuation pattern contracts, while as the rail pressure becomes higher than the reference rail pressure, K1 increases, that is, the fluctuation pattern is expanded.

Next, at step 107, the contraction rate or expansion rate K1 of the fluctuation pattern is multiplied with the time interval TI so as to calculate the modified time interval Ti. Next, at step 108, this modified time interval is multiplied with the reciprocal of the time interval ratio, that is, the reciprocal of the propagation speed ratio VR, to calculate the final modified time interval Ti. Next, at step 109, if the reference rail pressure is made 80 MPa, the reference main injection amount QM is made 20 ($mm^3$), and the reference pilot injection amount QP is made 2 ($mm^3$), that is, the fluctuation amount shown by the ○ marks in FIG. 10B is made the reference fluctuation amount dQ, the reference fluctuation amount dQ in accordance with the modified time interval Ti is calculated.

Figure 13B:
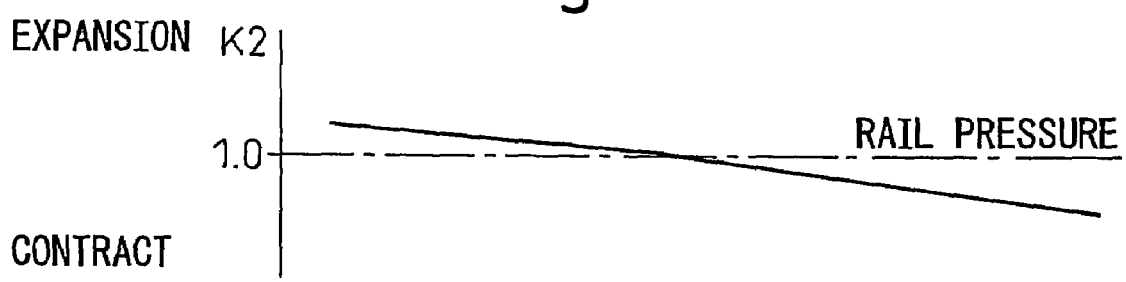

Next, at step 110, the contraction rate or expansion rate K2 of the fluctuation pattern when contracting or expanding the fluctuation pattern of the main injection amount in a direction increasing or reducing the fluctuation amount of the main injection in accordance with the rail pressure to overlay it on the reference fluctuation pattern is calculated. The change of K2 is shown in FIG. 13B. As shown in FIG. 13B, near the rail pressure serving as the reference, the value of K2 becomes 1.0. When the rail pressure becomes lower than the reference rail pressure, the value of K2 becomes larger than 1.0, while when the rail pressure becomes higher than the reference rail pressure, the value of K2 becomes smaller than 1.0.

Figure 13C:
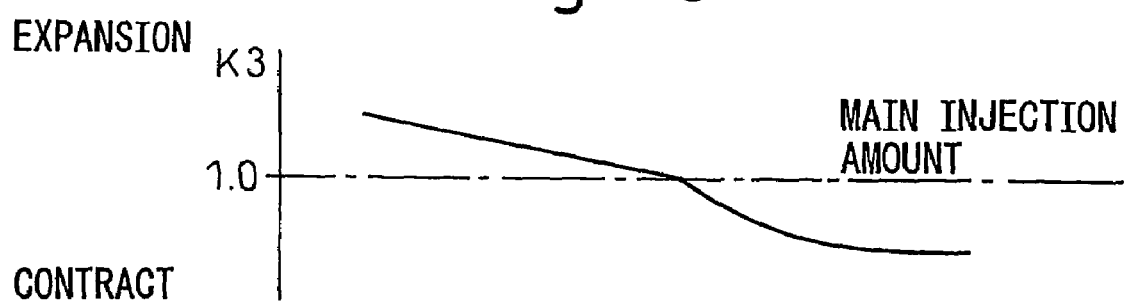

Next, at step 111, the contraction rate or expansion rate K3 of the fluctuation pattern when contracting or expanding the fluctuation pattern of the main injection amount in a direction increasing or reducing the fluctuation amount of the main injection in accordance with the main injection amount QM to overlay it on the reference fluctuation pattern is calculated. As shown in FIG. 13C, near the main injection amount serving as the reference, the value of K3 becomes 1.0. When the main injection amount becomes lower than the reference main injection amount, the value of K3 becomes larger than 1.0, while when the main injection amount becomes higher than the reference main injection amount, the value of K3 becomes smaller than 1.0.

Next, at step 112, the reference fluctuation amount dQ calculated at step 109 is multiplied with the reciprocal of the contraction rate or expansion rate K2 and K3 to calculate the final fluctuation amount dQ of the main injection. Next, at step 113, a command value of the main injection is corrected so that the actual injection amount becomes the target value based on this fluctuation amount dQ. For example, when the fluctuation amount dQ is plus, the command value of the main injection is corrected so that the main injection amount QM calculated at step 101 is reduced by the fluctuation amount dQ and the actual injection amount becomes the reduced main injection amount (QM−dQ). As opposed to this, if the fluctuation amount dQ is minus, the command value of the main injection is corrected so that the main injection amount QM is increased by the fluctuation amount dQ and the actual injection amount becomes the increased main injection amount (QM+dQ). In this way, the actual injection amount is controlled to the target value QT. Next, at step 114, the processing for injection of the pilot injection and main injection is performed.

The invention claimed is:

1. A fuel injection system of an internal combustion engine provided with a common rail and fuel injectors connected to the common rail, performing fuel injection from each fuel injector at least the two times of prior injection and later injection during one cycle of the engine, and changing in fluctuation amount of the later injection with respect to a target value depending on a time interval from when the prior injection is performed to when the later injection is performed, said fuel injection system of an internal combustion engine provided with a calculation device for calculating a propagation speed of pressure pulsation generated in a fuel injector at the time of prior injection, estimate fuel properties from the calculated propagation speed, and modifying a control constant of the engine based on the estimated fuel properties.

2. A fuel injection system of an internal combustion engine as set forth in claim 1, wherein a reference time interval where said fluctuation amount of the later injection becomes a reference value when using fuel serving as a reference in a predetermined operating state of the engine is stored in advance, a time interval where said fluctuation amount of the later injection becomes the reference value when the operating state of the engine during engine operation becomes said predetermined operating state of the engine is found, and a propagation speed of a pressure pulsation in the fuel used at that time is calculated from a time interval ratio of the reference time interval and the found time interval.

3. A fuel injection system of an internal combustion engine as set forth in claim 2, wherein said reference value is zero.

4. A fuel injection system of an internal combustion engine as set forth in claim 2, wherein said predetermined operating state of the engine is an idling operation state.

5. A fuel injection system of an internal combustion engine as set forth in claim 2, wherein an engine speed where said fluctuation amount of the later injection becomes a reference value is stored in advance as a target speed and wherein a time interval is gradually changed so that the engine speed becomes the target speed when the operating state of the engine during engine operation becomes said predetermined operating state of the engine whereby the time interval where the fluctuation amount of the later injection becomes the reference value is found.

6. A fuel injection system of an internal combustion engine as set forth in claim 2, further provided with a storage device storing a reference fluctuation amount of a later injection changing in accordance with a reference fluctuation pattern along with an increase in the time interval when the rail pressure is a predetermined reference rail pressure and is provided with a fluctuation calculation device for calculating said fluctuation amount of the later injection in accordance with the rail pressure from the reference fluctuation amount and the time interval using said time interval ratio and a control device for controlling the injection amount to a target value using the fluctuation amount calculated by the fluctuation calculation device.

7. A fuel injection system of an internal combustion engine as set forth in claim 6, wherein said fluctuation calculation device multiplies the time interval with a reciprocal of said time interval ratio to find a modified time interval when the rail pressure is not the reference rail pressure and makes the reference fluctuation amount in accordance with said modified time interval said fluctuation amount of the later injection.

* * * * *